United States Patent [19]
Hata et al.

[11] Patent Number: 6,001,761
[45] Date of Patent: *Dec. 14, 1999

[54] CERAMICS SHEET AND PRODUCTION METHOD FOR SAME

[75] Inventors: Kazuo Hata; Norikazu Aikawa, both of Himeji; Hideki Imai, Hyogo; Tetuya Yasaka, Suita, all of Japan

[73] Assignee: Nippon Shokubai Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/858,561

[22] Filed: May 19, 1997

Related U.S. Application Data

[63] Continuation of application No. 08/534,200, Sep. 26, 1995, abandoned.

[30] Foreign Application Priority Data

| Sep. 27, 1994 | [JP] | Japan | 6-231547 |
| Sep. 19, 1995 | [JP] | Japan | 7-240292 |
| Sep. 19, 1995 | [JP] | Japan | 7-240293 |
| Sep. 19, 1995 | [JP] | Japan | 7-240294 |

[51] Int. Cl.$^6$ ................................ C04B 35/486
[52] U.S. Cl. .......................... 501/103; 501/104; 501/105; 501/127; 429/33; 429/304; 204/421; 204/295; 264/608; 264/618; 264/650
[58] Field of Search .................... 501/103, 104, 501/105, 127; 429/33, 193, 320, 304; 264/608, 618, 650; 204/421, 295

[56] References Cited

U.S. PATENT DOCUMENTS

| 5,057,360 | 10/1991 | Osaka et al. | 501/103 |
| 5,089,455 | 2/1992 | Ketcham et al. | 501/104 |
| 5,122,487 | 6/1992 | Hayaakawa et al. | 501/103 |
| 5,130,210 | 7/1992 | Iwasaki et al. | 501/105 |
| 5,242,873 | 9/1993 | Singh et al. | 501/105 |
| 5,292,693 | 3/1994 | Kaga et al. | 501/103 |
| 5,620,637 | 4/1997 | Kaga et al. | 264/650 |

FOREIGN PATENT DOCUMENTS

| 0 313 412 | 4/1989 | European Pat. Off. . |
| 0 479 219 | 4/1992 | European Pat. Off. . |
| 63-178549 | 7/1988 | Japan . |
| 63-295480 | 12/1988 | Japan . |
| 2-225361 | 9/1990 | Japan . |
| 3-40968 | 2/1991 | Japan . |
| 910065513 | 3/1991 | Japan . |
| 4-65028 | 10/1992 | Japan . |
| 5-4868 | 1/1993 | Japan . |
| 5-21864 | 3/1993 | Japan . |
| 5-85819 | 4/1993 | Japan . |
| 6-9268 | 1/1994 | Japan . |
| 7-82043 | 3/1995 | Japan . |

OTHER PUBLICATIONS

Patent Abstract of Japan, JP 6–132644, May 13, 1994.
Patent Abstract of Japan, JP 4–32546, Nov. 13, 1992.
Patent Abstract of Japan, JP 2–311371, Dec. 26, 1990.
Patent Abstract of Japan, JP 2–294091, Dec. 5, 1990.
Patent Abstract of Japan, JP 6–207785, Jul. 26, 1994.
Proceedings of the International Symposium on Solid Oxide Fuel Cell, pp. 747–753, Jul. 2–5, 1991, A. Titinelli, et al., "Casting and Characterization of Thin Y–TSZ Sheets".
Catalog A—(Flexible Zirconia Thin Plate); Nippon Fine Ceramics Kabushiki Kaisha; and NIkki Kabushiki Kaisha (JGC Corporation), Apr. 1992.
Catalog B—(Ceraflex–A Type); Nippon Fine Ceramics Kabushiki Kaisha, May 1991.

*Primary Examiner*—Karl Group
*Attorney, Agent, or Firm*—Oblon, Spivak, McClelland, Maier & Neustadt, P.C.

[57] ABSTRACT

Disclosed are a ceramics sheet which has an area of 400 cm$^2$ or more, thickness of 0.4 mm or less, maximum waviness height of 100 μm or less, and warp of 0.1% or less and in which frequency of generated cracking and breakage is 10% or less when a load-applying test and a deflection-loading test each described in the text are carried out in succession, and a flat and large ceramics sheet having an area of 600 cm$^2$ or more and thickness of 1 mm or less. Further, disclosed is a method for producing a ceramics sheet having the characteristics described above and characterized in that in calcining a ceramics green sheet to produce a ceramics sheet, the green sheet described above is interposed between porous sheets which have bulk density corresponding to 30 to 85% of the theoretical density and in which the shrinkage rate caused by heating up to the calcining temperature of the above green sheet is 5% or less on condition that the periphery of the green sheet does not protrude from the porous sheets, and calcined.

16 Claims, 1 Drawing Sheet

CERAMICS SHEET AND PRODUCTION METHOD FOR SAME

This application is a Continuation of application Ser. No. 08/534.200, filed on Sep. 26, 1995, now abandoned.

BACKGROUND OF THE INVENTION

Ceramics are widely employed in many fields because of excellent electric and magnetic characteristics and biological compatibility as well as mechanical properties such as a heat resistance and an abrasion resistance properties thereof. Among them, a ceramics substrate comprising primarily zirconia has excellent oxygen ion conductivity and heat and corrosion resistance properties and therefore can be effectively applied as a sensor part, an electrolyte film for a fuel cell or a setter for calcination. In order to use ceramics for these applications, they are preferably close ceramics sheets, and therefore fine powders of so-called submicron which are easy to sinter are usually used as a raw material powder. However, the use of fine powders makes it difficult to decompose and remove a binder component and is liable to cause waviness and warp particularly in large and thin sheet moldings because of a large shrinkage generated in sintering process.

A method generally carried out for producing a ceramics sheet is a method in which a slurry comprising a ceramics raw material powder such as alumina, an organic binder and a solvent is molded into a sheet by a doctor blade method, a calendar method or an extrusion method; the resultant sheet is dried to evaporate the solvent and a green sheet is obtained; thereafter the green sheet is arranged to a suitable size by cutting or punching, placed on a setter and calcined to decompose and remove the organic binder; and then, the ceramics powder is sintered.

In general, when a green sheet is treated with heat to prepare a ceramics sheet, it is very difficult to secure an overall and even heat-atmospheric condition (temperature distribution, kinds and concentration of atmospheric gas, flow of atmospheric gas, and the like), and unevenness of the thermal condition is therefore generated at various parts of a sheet, so that warp and waviness are liable to generate. In other words, the presence of a slight difference of degreasing conditions at the respective parts of the sheet prevents the binder from being uniformly removed and generates waviness. A sheet shrinks as it is sintered in calcining, and generating a slight heat atmospheric difference at the respective parts of the sheet results in uneven shrinkage to cause waviness and cracking. In particular, a thin ceramics sheet having thickness of 1 mm or less is light in its own weight, and therefore the sheet itself is easier to be lifted than a conventional thick sheet and more liable to cause waviness. Further, when the respective parts of a sheet moves from the end part to the central part as shrinkage proceeds, the presence of a slight irregularity on a setter or causing abrasion prevents the shrinkage and is easy to cause waviness and cracking.

In the calcination of a sheet having a size of up to a level of 20 square cm (400 cm$^2$) after sintering, a relatively thin setter with a high density and a high strength can be used. However, in a sheet which is larger than that, a porous thick setter has to be used so that it is not bent even at high temperature, and since the setter becomes insulating and very large in heat capacity, large difference in the temperature is generated between the end and the center of the setter in elevating and lowering the temperature to result in thermal unevenness. Further, when a large sheet is calcined in an electric furnace of a system in which heating is carried out by a heater from the side face and the ceiling or the hearth, the sheet is too large for the furnace, and therefore some part of the sheet is close to the furnace and another part is far there-from, which causes thermal unevenness at the respective parts even in one sheet. Or, a large gas furnace has room in a size of a soaking area in an empty furnace, but the use of a large setter makes it impossible to secure a sufficient path for gas (flame) and is therefore still liable to cause thermal unevenness. These thermal unevenness and prevention of shrinkage are more marked in a sheet having a larger size after sintering and come out notably when the sheet is as large as, for example, exceeding 400 cm$^2$. In particular, the above descrived tendency becomes marked when the sheet is as large as exceeding 600 cm$^2$, which causes waviness and warp. Such tendency comes out even to a relatively small-sized sheet having a size of less than 400 cm$^2$.

Warp and waviness are generated in no small quantities in the thus obtained ceramics sheet even if one green sheet is placed on a setter of one layer and calcined, and larger warp and waviness are generated if, for the purpose of raising the productivity, plural green sheets are superposed one over another on a setter of one layer, and calcined. In particular, such a tendency is marked in the calcination of a green sheet produced using a ceramics powder raw material of submicron. Warp and waviness generated on the ceramics sheet after calcination bring about a locally concentrated stress when a load and a bending force are applied on the said sheet, which causes cracking and breakage. Such a warp and waviness can be reformed by a method in which a sheet is calcined again with a load applied on the sheet. However, cracking and breakage are often generated on the sheet during this reforming process and they can be a large cause of reduction in a yield. And further, it is not preferred from the viewpoint of energy saving that calcination is carried out twice or more.

Accordingly, a method disclosed in, for example, JP-A-6-9268 is proposed as a technique for improving such difficulty. In this method, a ceramics green sheet is calcined with a load applied on the sheet. Employing such a method suppresses warp and waviness at the calcining stage as much as possible and can provide a ceramics sheet having excellent surface flatness. However, the characteristics described above are effectively revealed only when relatively small ceramics sheets are placed on a setter of one layer one by one and calcined. Then, when thin ceramics sheets having a size exceeding 225 cm$^2$ are calcined for example, plural plates for applying a load are arranged and placed, traces are easy to be marked on the green sheets at the joints of the plates, and therefore it is difficult to suppress waviness and warp sufficiently.

On the other hand, ceramics sheets used for the applications described above have been provided in the form of small sheets having a size falling in a level of 400 cm$^2$ at the most because of the foregoing reasons, and as the applications thereof are diversified, ceramics sheets which are as thin as 1 mm or less, preferably 0.4 mm or less and as large as 400 cm$^2$ or more, preferably 600 cm$^2$ or more are required. However, the existing state is that as described above, it is very difficult to control warp and waviness generated in calcination to lower levels, and the sheets satisfying the requirements of consumers in terms of surface flatness, withstand-load strength and bending characteristic have not yet been obtained.

Also in a sheet having as relatively small size as less than 400 cm$^2$, slight waviness and warp generated by the causes described above may be a significant cause for deterioration of quality in some cases depending on the applications thereof.

SUMMARY OF THE INVENTION

The present invention has been made taking note of the circumstances described above, and an object thereof is to provide a thin ceramics sheet which has small waviness and warp and is excellent in withstand-load strength and bending strength. Another object of the present invention is to provide a method to surely obtain a ceramics sheet having less warp and waviness, excellent surface flatness, withstand-load strength and bending strength in the production of ceramics sheets of all sizes from a small size to a large size.

The ceramics sheet of the present invention has excellent heat insulating property and electrical insulating property. It not only is very useful as, for example, a sensor part, an electrolytic film for a fuel cell, a setter for calcination, and a hybrid IC circuit substrate in an electronics field, but also can be effectively applied to various applications such as a heat resistant and fire resistant board and a sliding member with making use of the excellent heat resistance and abrasion resistant characteristic thereof.

Among them, a ceramics sheet comprising primarily zirconia and alumina can be effectively applied to various structural materials, cutters, and setters for calcination with making use of the mechanical strength, toughness, abrasion resistance, chemical resistance, and corrosion resistance thereof, and a ceramics sheet comprising primarily zirconia (in particular, cubic crystalized zirconia) can be effectively used as solid electrolytic films for an oxygen sensor and a humidity sensor, and further a solid electrolytic film for a fuel cell with making use of the excellent oxygen ion conductivity thereof. Aluminum nitride has excellent insulating property, heat resistance and heat conductivity and is therefore useful as an electrical circuit substrate with making use of such characteristics.

The first constitution of the ceramics sheet of the present invention is characterized in that the sheet has an area of 400 $cm^2$ or more, thickness of 0.4 mm or less, a maximum waviness height of 100 $\mu$m or less, and a warp of 0.1% or less and that a frequency of generated cracking and breakage is 10% or less when the following load-applying test and deflection-loading test are carried out in succession Load-applying Test A ceramics sheet is interposed between alumina plates with high density having flat faces, and a load of 0.1 kgf/$cm^2$ is applied on the whole face of the said ceramics sheet.

Deflection-loading Test

Force is applied to two oppositely disposed sides of a ceramics sheet in a direction which is parallel to the surface of the sheet and in which the sides are pushed each other to deflect the ceramics sheet, and a deflection height h (mm) is expressed by the following equation:

$$h=0.002 \times d/t^2 \text{ (provided that } h \leq 0.1 \times d)$$

Wherein d (mm) is a distance between the oppositely disposed sides, and t (mm) is the thickness of the ceramics sheet.

A deflecting operation is repeated six times at one time/second alternatively in front and back directions.

The second constitution of another ceramics sheet according to the present invention is characterized in that the sheet is a flat, large and thin ceramics sheet having an area of 600 $cm^2$ or more and thickness of 1 mm or less. The large ceramics sheet according to the second invention has preferably maximum waviness height of 100 $\mu$m or less and warp of 0.1% or less, and more preferably, the sheet scarcely causes cracking in the following load-applying test. "Scarcely cause cracking" means here that the number of cracked sheets in all the tested sheets accounts for 5% or less in the load-applying test.

Load-applying Test

A ceramics sheet is interposed between alumina plates with high density having flat faces, and a load of 0.1 kgf/$cm^2$ is applied on the whole face of the ceramics sheet.

Among the ceramics sheet according to the first and second inventions described above, a ceramics sheet comprising zirconia, particularly cubic zirconia as the main component, or a ceramics sheet comprising zirconia as the main component and containing an oxide of at least one metal selected from the group consisting of Y, Ce, Ca, Mg, Ti, Si, and Al as the other components is very useful as, for example, an electrolytic film for a fuel cell. Among these ceramics sheets, the sheet in which a raw material powder which has average particle diameter of 0.1 to 0.5 $\mu$m and in which 90 volume % or more of the powder has a particle diameter of 1 $\mu$m or less, and when the density corresponds to 90% or more of the theoretical density, the sheet is more homogeneous and has an excellent performance. The form of the ceramics sheet is not specifically restricted, and the form most generally used is square or rectangular.

Further, the third constitution of the present invention is to provide a method for producing a flat ceramics sheet having excellent physical properties independent of the size of the ceramics sheet as shown above. The constitution thereof is characterized in that:

a) in calcining a ceramics green sheet to produce a ceramics sheet, the green sheet described above is interposed between porous sheets which have bulk density corresponding to 30 to 85% of the theoretical density and in which the shrinkage rate caused by heating up to the calcining temperature of the above green sheet is 5% or less on condition that the periphery of the green sheet does not protrude from the porous sheets, and calcined, or b) in calcining a ceramics green sheet to produce a ceramics sheet, a porous sheet which has bulk density corresponding to 30 to 85% of the theoretical density and in which the shrinkage rate caused by heating up to the calcining temperature of the above green sheet is 5% or less is placed on the green sheet described above on condition that the periphery of the green sheet does not protrude from the porous sheet, and calcined.

The porous sheet used in carrying out these production methods has preferably thickness of 0.1 to 2 mm and weight per unit area of 0.01 to 1 g/$cm^2$. Preferably used is the porous sheet comprising at least one oxide selected from the group consisting of alumina, titania, silica, celia and zirconia as the primary component and calcined at higher temperature than the calcining temperature of the ceramics green sheet described above. Further, particularly preferred as this porous sheet is a porous sheet obtained by calcining a green sheet so that the bulk density becomes 30 to 85% of the theoretical density, the green sheet being obtained by molding a slurry containing powder having average particle diameter of 2 to 100 $\mu$m and a binder into a sheet. Preferred as raw material powder for the ceramics sheet produced by this production method is a substance comprising at least one selected from the group consisting of zirconia, alumina, and aluminum nitride as the main component. Among them, more preferred is a substance comprising zirconia, particularly cubic zirconia as the primary component. Further, a ceramics sheet having an excellent performance for example, as an electrolytic film for a fuel cell can be obtained by applying this method to the production of a ceramics sheet comprising zirconia (particularly cubic crystalized zirconia) as the primary component and containing an oxide of at least one metal selected from the group consisting of Y, Ce, Ca, Mg, Ti, Si, and Al as the other components.

DETAILED DESCRIPTION OF THE PREFERRED EMBODIMENTS

Figure 1:
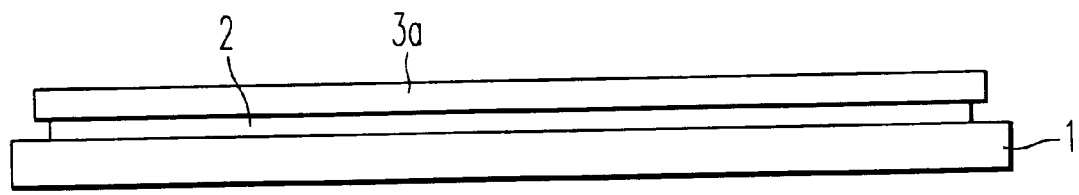
FIG. 1 is a drawing for explaining one example of the production method for the ceramics sheet according to the present invention.

As described above, the first ceramics sheet of the present invention is characterized in that the sheet has an area of 400 $cm^2$ or more, thickness of 0.4 mm or less, maximum waviness height of 100 $\mu$m or less, and warp of 0.1% or less and that a frequency of generated cracking and breakage is 10% or less in terms of a sheet number when the load-applying test and deflection-loading test described above are carried out in succession. Excellent characteristics which have not been found in known ceramics in terms of form characteristics (flatness, that is, maximum waviness height and warp) and strength characteristics (load resistant strength and deflection resistant strength) are provided in a ceramics sheet satisfying such an area and thickness and the small waviness and warp and further provided with load resistant and deflection resistant strength characteristics, which is a novel sheet clearly distinguishable from known ceramics sheets.

The second ceramics sheet according to the present invention is characterized in that the sheet has an area as large 600 $cm^2$ or more and thickness of 1 mm or less, and as was described in detail in the above known technique, such a large and thin ceramics sheet having excellent flatness has never been able to be obtained. In particular, the large ceramics sheet having such excellent flatness as maximum waviness height of 100 $\mu$m or less and warp of 0.1% or less is quite novel in itself.

The warp defined in the present invention means the percentage of the value obtained by dividing the warp height with the length of the sheet. The preferred value thereof has been determined at 0.1% or less because in a sheet having warp exceeding this value, stress is concentrated upon the warped part when an external force parallel to the sheet face is applied, which causes the generation of cracking. The warp more preferred for revealing further effectively the characteristics of the present invention is 0.06% or less.

Further, the characteristic that "frequency of generated racking and breakage is 10% or less in a load-applying test and a deflection-loading test" prescribed as a physical property in the above first ceramics sheet of the present invention is a very important characteristic for preventing the characteristics of the sheet from being damaged by causing cracking and breakage by a load applied to the sheet and an external force applied to the bending direction, when a lot of the said ceramics sheets are superposed one over another in order to use them as a solid electrolytic film for a fuel cell, or when the sheet is interposed between flat supporting substrates in order to use it for other applications. A ceramics sheet, which has only slight cracks, is broken in the deflection-loading test described above. Accordingly, a ceramics sheet having fine cracks which are not visually observed in the load-applying test will be broken in the deflection-loading test. Thus, in testing the performance of a ceramics sheet, the performance thereof can be more accurately grasped by carrying out the deflection-loading test after the load-applying test. It has to be noted that it is hard to carry out such a deflection-loading test in order to observe the above described cracking in case the toughness of a ceramics sheet is insufficient due to the thickness over 0.4 mm, or in case the load is not applied uniformly all over a ceramics sheet in such forms as a circle, one with holes and the like.

It is not until the production method which is the third constitution of the present invention is employed that it has become possible to produce such a ceramics sheet provided with such flatness and physical properties. To be concrete, it has become possible to produce the above ceramics sheet by employing a method in which, in calcining a ceramics green sheet to produce a ceramics sheet, the ceramics green sheet is interposed between porous sheets which have a larger area than that of the green sheet and bulk density corresponding to 30 to 85% of the theoretical density and in which the shrinkage rate caused by heating up to the calcining temperature of the above green sheet is 5% or less on condition that the periphery of the green sheet does not protrude from the porous sheets, and calcined, or a method in which the same porous sheet as that described above is placed on the green sheet described above on condition that the periphery of the green sheet does not protrude from the porous sheet, and calcined, and by preventing the deformation of the sheet in calcination as much as possible to suppress warp and waviness.

The ceramics sheet obtained by the methods described above has excellent flatness and is of a high quality satisfying the values of, as will be described later, maximum waviness height of 100 $\mu$m or less and warp of 0.1% or less even in the sheet having a size of about 400 $cm^2$ or more as well as a relatively small size of less than 400 $cm^2$ in terms of a size of a sintered sheet, and a large size of 600 $cm^2$ or more and thickness of 1 mm or less, further a thin thickness of 0.4 mm or less.

These physical properties are very important for preventing the characteristics of the sheet from being damaged by causing cracking and breakage by a load applied to the sheet and an external force applied to the bending direction when a lot of ceramics sheets are superposed one over another in order to use them as a solid electrolytic film for a fuel cell or when the sheet is interposed between flat supporting substrates in order to use it for other applications.

In this connection, ceramics sheets produced by conventional methods, particularly thin and large ceramics sheets having an area of 400 $cm^2$ or more and thickness of 0.4 mm or less, or an area of 600 $cm^2$ or more and thickness of 1 mm or less, have waviness and warp in no small quantities because of the reason described above and cause readily cracking and breakage when they are used in the form described above, which damages notably the commercial value and causes practicability to be lost in the worst cases.

On the other hand, the employment of the above methods prescribed in the present invention can readily provide a ceramics sheet with excellent characteristics, having small maximum waviness and warp as described above and strength which makes it possible to stand in the use form described above. The form of the ceramics sheet obtained in the present invention can be a polygon such as a triangle and a pentagon and an ellipse according to necessity as well as a square, a rectangle, and a circle. Further, it may take forms having holes or notches in the forms described above. The ceramics sheet having the widest use is of a square or a rectangle. The density thereof corresponds preferably to 90% or more (more preferably 95% or more) of the theoretical density.

The raw material used in the present invention includes various ceramics such as, for example, alumina, zirconia, ceria, titania, silica, mullite, cordierite, spinel, forsterite, anorthite, selsian, enstatite, aluminum nitride, and silicon nitride, particularly preferably zirconia, alumina or aluminum nitride, more preferably zirconia or aluminum nitride, and the most preferably zirconia (particularly cubic crystalized zirconia), and contains powder comprising them as the primary components (preferably about 80 weight % or more), or in addition to these, at least one oxide (preferably about 20 weight % or less) of metal selected from the group consisting of Y, Ce, Ca, Mg, Ti, Si, and Al as other oxides.

For example, the ceramics sheet, comprising mainly yttria-full stabilized zirconia, having a size of 30 square cm and thickness of 0.2 mm, and satisfying the form characteristics of maximum waviness height and warp shows high values of withstand-load strength of 0.1 kgf/cm$^2$ or more and average-three points-bending strength of 35 kgf/mm$^2$ or more, and has as high oxygen ion conductivity as 7.2 kS or more per one sheet at 1000 C. The above sheet reveals excellent thermal, mechanical, physical, electrical and chemical characteristics as a sensor part, an electrolytic film for a fuel cell, or a setter for calcination.

In carrying out the methods of the present invention, a ceramics green sheet is interposed between porous sheets which have a larger area than that of the green sheet and bulk density corresponding to 30 to 85% of the theoretical density and in which the shrinkage rate caused by heating up to the calcining temperature of the above green sheet is 5% or less on condition that the periphery of the green sheet does not protrude from the porous sheets, and calcined, or the same porous sheet is placed on the green sheet described above on condition that the periphery of the green sheet does not protrude from the porous sheet, and calcined.

That is, a slurry comprising the mixture of the ceramics raw material powder, the organic or inorganic binder, and the solvent each described above is coated on a flat substrate to a prescribed thickness by a doctor blade method, a calendar method, and an extrusion method, and dried to evaporate and remove the solvent, whereby a green sheet is obtained. This green sheet is calcined in the conditions described above. The material for the ceramics raw material powder used for producing the above green sheet is as described above. In producing the green sheet, preferably used is powder in which the average particle diameter is 0.1 to 0.5 $\mu$m and the particle diameter is uniform. To be concrete, it is preferable that each the particle of 90 volume % or more of the said powder has diameter of 1 $\mu$m or less. More preferable particle size constitution is the average particle diameter is 0.2 to 0.3 $\mu$m, and each particle of 90 volume % or more of the powder has a particle diameter of 0.7 m or less. Further more preferred is powder in which the particle diameter is uniform and each particle of 90 volume % or more of the powder has a particle diameter of 0.07 $\mu$m or more. Here, the particle diameter distribution is a value measured with a laser diffraction system particle size distribution measuring apparatus (brand name: SALD-1100 produced by Shimazu-Seisakusho K. K.) using a 0.2 weight % sodium metaphosphate aqueous solution as a dispersion medium.

In the case where the average particle diameter of ceramics raw material powder is too small, while there is an advantage that a close ceramics sheet having a good sintering performance is easily obtained, a tendency is brought about in which the binder component is hard to decompose and release uniformly in calcination, which results in exerting an adverse effect on the homogeneity as the whole ceramics sheet. Reversely, in the case where the average particle diameter is too large, while the decomposition and release of a binder component in calcination proceeds thoroughly and evenly, inferior sintering is caused and the density can not be sufficiently increased, which makes it difficult to obtain a close ceramics sheet. Further, a broader particle distribution of the raw material powder and particularly the presence of particles having large particle diameters cause a binder component to be decomposed and released unevenly, and bring about uneven shrinkage in a sintering process to easily produce waviness. These results come out markedly in a large ceramics sheet comprising zirconia as a main component.

The kind of the binder used in the present invention is not specifically restricted, and conventional organic or inorganic binders can suitably be selected and used. The organic binder includes, for example, ethylene-based copolymers, styrene-based copolymers, acrylate and methacrylate-based copolymers, vinyl acetate-based copolymers, maleic acid-based copolymers, vinyl butyral-based resins, vinyl acetal-based resins, vinyl formal-based resins, vinyl alcohol-based resins, waxes, and celluloses such as ethyl cellulose.

Among them, recommended as preferred from the viewpoint of moldability, strength, and heat decomposability in calcining are acrylate or methacrylate-based copolymers having a number-average molecular weight of 20,000 to 200,000, more preferably 50,000 to 100,000, which are obtained by polymerizing or copolymerizing at least one selected from the group comprising alkyl acrylates having an alkyl group with 10 or less carbon atoms, such as methyl acrylate, ethyl acrylate, propyl acrylate, butyl acrylate, isobutyl acrylate, cyclohexyl acrylate, and 2-ethylhexyl acrylate; alkyl methacrylates having an alkyl group with 20 or less carbon atoms, such as methyl methacrylate, ethyl meth-acrylate, butyl methacrylate, isobutyl methacrylate, octyl meth-acrylate, 2-ethylhexyl methacrylate, decyl methacrylate, dodecyl methacrylate, lauryl methacrylate, and cyclohexyl methacrylate; hydroxyalkyl acrylates or hydroxyalkyl methacrylates having hydroxyalkyl groups, such as hydroxyethyl acrylate, hydroxypropyl acrylate, hydroxyethyl methacrylate, and hydroxypropyl methacrylate; aminoalkyl acrylates or aminoalkyl methacrylates such as dimethylaminoethyl acrylate and dimethylaminoethyl meth-acrylate; and carboxyl group-containing monomers such as acrylic acid, methacrylic acid, maleic acid, and maleic semi-ester such as monoisopropyl maleate. These organic binders can be used singly but can be used as well by suitably combining two or more kinds according to necessity. Particularly preferred is a polymer of a monomer containing 60 weight % or more of isobutyl meth-acrylate and/or 2-ethylhexyl methacrylate.

Zirconia sol, silica sol, alumina sol, and titania sol can be used as the inorganic binder singly or in the form of a mixture of two or more kinds.

The use ratio of the ceramics raw material powder to the binder falls preferably in the range that 5 to 30 weight parts, more preferably 10 to 20 weight parts of the binder per 100 weight parts of the ceramics raw material. The insufficient use of the binder makes the strength and flexibility of a green sheet insufficient, and contrarily excess use not only makes it difficult to control the viscosity of the slurry but also causes the binder component to be decomposed and released heavily in a large amount in calcining, which makes it difficult to obtain a homogeneous sheet.

Suitably selected and used as the solvent employed for producing a green sheet are water; alcohols such as methanol, ethanol, 2-propanol, 1-butanol, and 1-hexanol; ketones such as acetone and 2-butanone; aliphatic hydrocarbons such as pentane, hexane, and heptane; aromatic hydrocarbons such as benzene, toluene, xylene, and ethylbenzene; and acetic esters such as methyl acetate, ethyl acetate, and butyl acetate. These solvents can be used singly but can be used as well by suitably combining two or more kinds. The use amount of these solvents can suitably be controlled considering the viscosity of the slurry in molding the green sheet and preferably controlled so that the slurry viscosity falls preferably in a range of 10 to 200 poise, more preferably 10 to 50 poise.

In preparing the slurry described above, in order to promote the peptization and dispersion of a ceramics raw material powder, there can be added polyelectrolytes such as polyacrylic acid and poly(ammonium acrylate); organic acids such as citric acid and tartaric acid; dispersing agents comprising a copolymer of isobutylene or styrene and maleic anhydride and the ammonium salt or amine salt thereof, or a copolymer of butadiene and maleic anhydride and the ammonium salt thereof; plasticizers for providing a green sheet with flexibility, comprising phthalic esters such as dibutyl phthalate and dioctyl phthalate, glycols such as propylene glycol, and glycol ethers; and further surface active agents, and defoaming agents.

In the present invention, the slurry comprising the raw material blend described above is molded into a sheet by the methods described above and dried to obtain a ceramics green sheet, followed by heating and calcining this, whereby a ceramics sheet is produced. In this calcining process, as means for obtaining a ceramics sheet having excellent flatness without causing warp and waviness, the ceramics green sheet is interposed between porous sheets which have a larger area than that of the green sheet and bulk density corresponding to 30 to 85% of the theoretical density and in which the shrinkage rate caused by heating up to the calcining temperature of the above green sheet is 5% or less on condition that the periphery of the green sheet does not protrude from the porous sheets, and calcined, or the same porous sheet described above is placed on the above green sheet on condition that the periphery of the green sheet does not protrude from the porous sheet, and calcined.

The porous sheet used here is the most important structural requisite for obtaining a ceramics sheet having excellent flatness which is aimed in the present invention. That is, as was explained previously, when a small ceramics sheet is produced, a green ceramics sheet is calcined with a flat sheet-form weight placed thereon, whereby a ceramics sheet having a relatively high flatness is obtained on rare occasions. However, in case of a thin ceramics sheet having an area of 400 cm² or more and thickness of 0.4 mm or less, or an area of 600 cm² or more and thickness of 1 mm or less, it is not easy to unformly proceed the decomposition and release of a binder and a volume shrinkage following the calcination of a ceramics green sheet to over the whole green sheet, and the release of a decomposition gas of the binder and a volume shrinkage become uneven locally. In particular, the density is not sufficiently increased or warp is generated in the vicinity of the central part of the sheet because of inferior sintering caused by the insufficient release of the decomposition gas of the binder, and an uneven volume shrinkage is liable to cause waviness at the peripheral side. Accordingly, a thin ceramics sheet having excellent flatness which is aimed in the present invention is not obtained. Particularly in a thin sheet having a small weight of itself and thickness of 0.4 mm or less, uneven parts are readily lifted, and therefore waviness is liable to cause at the peripheral side.

However, as described above, when porous sheets, which have a larger area than that of a green sheet and bulk density corresponding to 30 to 85% of the theoretical density and in which the shrinkage rate caused by heating up to the calcining temperature of the above green sheet is 5% or less, are used for supporting and reforming in calcination and the green sheet described above is interposed between the above porous sheets on condition that the periphery of the green sheet does not protrude from the porous sheets, and calcined; or the porous sheet described above is placed on the above green sheet on condition that the periphery of the green sheet does not protrude from the porous sheet, and calcined, insufficient sintering, waviness and warp caused by to the inferior release of a decomposition gas of a binder as described above are notably suppressed, and a ceramics sheet having very excellent flatness is obtained.

On the other hand, when the size of a porous sheet is smaller than that of a green sheet to be sintered, and the periphery of the green sheet protrudes from the porous sheet, the green sheet is deformed at this protruding part, and therefore a ceramics sheet having excellent flatness can not be obtained. When plural small porous sheets are used in line, marks may remain on a ceramics sheet at the joint thereof in some cases. When the shrinkage rate caused by heating up to the calcining temperature of the above green sheet exceeds 5%, not only the above porous sheet can not be stably used plural times, but also a flatness reforming effect is not revealed effectively due to the shrinkage of the porous sheet in the calcination of a green sheet, and a ceramics sheet having excellent flatness can not be obtained as well.

Particularly in the calcination of a large sheet, since it has been very difficult to secure overall and even heat atmospheric conditions, unevenness described previously has been caused, and therefore warp and waviness have been easy to generate. However, this heat atmospheric unevenness can be relieved to a large extent by covering the whole face of a ceramics green sheet with porous sheets as is the case with the methods of the present invention. In addition, the weight has an effect of to control warp and waviness, and therefore the calcination becomes possible in various furnaces such as an electric furnace or a gas furnace, and a batch system furnace or a continuous system furnace. Depending on the atmosphere of a furnace, particles of oxides of Fe, Si, Al, and Mo originating in heat insulating materials, a heater, and other calcined substances come flying and stick on a sheet surface in some cases. In the methods of the present invention, however, a sheet surface is protected by a porous sheet, and therefore this sticking can be prevented.

Further, the bulk density of the above porous sheet is prescribed in the present invention in order to not only make the surface of the porous sheet more dense and effectively reveal a surface reforming effect in calcination but also rapidly release gas components generated by the heat decomposition of a binder in calcination to the outside to accelerate degreasing. The above bulk density corresponding to less than 30% of the theoretical density causes the release of a decomposition gas to proceed efficiently without any problems but markedly deteriorates a handling property because of lack of strength and makes it impossible to use the porous sheet plural times. In addition to the above, the flatness of the surface is deteriorated, which results in making a reforming effect insufficient, and therefore a ceramics sheet having satisfactory surface precision is difficult to obtain. On the other hand, the use of a porous sheet having bulk density exceeding 85% of the theoretical density makes a degreasing effect and the release of decomposition gas insufficient due to a lowered gas permeability and causes the generation of cracking, warp and crinkle. A bulk density is determined by a convenient method in which the weight of a porous sheet is divided by the volume calculated from the product of an area and thickness.

However, as described above, when porous sheets, which have a larger area (preferably 1.0 to 1.5 time, more preferably 1.0 to 1.2 time) than that of a green sheet, in which the shrinkage rate caused by heating up to the calcining temperature of the above green sheet is 5% or less (more preferably 0.1% or less) and which have bulk density corresponding to 30 to 85% (more preferably 45 to 65%) of the theoretical density, are used for supporting and reforming in calcination, and the green sheet described above is interposed between the above porous sheets on condition that the periphery of the green sheet does not protrude from the porous sheets, and calcined, or the porous sheet described above is placed on the above green sheet on condition that the periphery of the green sheet does not protrude from the porous sheet, and calcined, not only an excellent surface reforming effect is revealed effectively but also a degreasing effect and the release of a decomposition gas become sufficient, and a ceramics sheet thus obtained is very homogeneous and has excellent flatness, which results in obtaining the ceramics sheet of a high quality satisfying the preferred characteristics of, for example, maximum waviness height of 100 $\mu$m or less, more preferably 50 $\mu$m or less, and in addition, further preferably maximum height (Rmax) of 1 $\mu$m or less, and warp of 0.1% or less, more preferably 0.06% or less.

The above maximum waviness height given here as a preferred standard expressing the flatness of a ceramics sheet means the height of the largest one among wavinesses generated on the ceramics sheet. The warp means the percentage of the value obtained by dividing a warped height with the length of the sheet. A sheet in which this value is large is liable to cause cracking by exerting stress (bending and tensile stresses) to the warped part when an external force parallel to the sheet face is applied.

To describe particularly waviness in detail, the larger the area of a ceramics sheet is, and the smaller the thickness is, this is more liable to generate. In the present invention, a value of [waviness ($\mu$m)×thickness (mm)/maximum length (mm)] can be 0.45 or less, preferably 0.1 or less, more preferably 0.06 or less, and further more preferably 0.03 or less. Here, the maximum length is a length corresponding to a diagonal line in case of a rectangle and a square and diameter in case of a circle.

Among the above methods, the effect of the present invention reveal effectively in the method in which a green sheet is interposed between porous sheets and calcined. As described above, when a sheet not satisfying the requisites described above is used in place of the above porous sheet, warp and waviness in no small quantities are generated even if one green sheet is placed on a setter of one layer and calcined, and if plural green sheets are placed one over another on a setter of one layer for the purpose of raising the productivity and calcined, much larger warp and waviness are generated. However, it has been found that since the present invention does not cause such problems, a lot of ceramics sheets can be produced at a good yield at one time and that the efficiency of calcination is notably improved.

Materials and production methods for the porous sheet having the bulk density as described above are not specifically restricted. A slurry containing the same inorganic powder as that exemplified as a raw material for producing a ceramics green sheet, an organic or inorganic binder, and a solvent is used to obtain a green sheet, and thereafter this green sheet is calcined adjusting calcining conditions so that the bulk density falls within the preferred range described above, whereby the porous sheet can be obtained. In this case, the use of powder having average particle diameter of 2 to 100 $\mu$m, preferably 30 to 80 $\mu$m as the inorganic powder readily provides a porous sheet having bulk density falling within the preferred range described above. The bulk density of the above porous sheet can be controlled according to the calcining conditions, and in addition, it can be controlled as well by changing the average particle diameter of used inorganic fine powder, the kind of binder, and the addition amount of a sintering aid. The use of powder having a smaller average particle diameter than the range described above makes it difficult to control the bulk density, and the use of powder having a larger average particle diameter than this range causes the flatness of the surface of the porous sheet to be lost and irregularities to transfer on a ceramics sheet.

In any case, with respect to the calcining conditions for producing the above porous sheet, considering conditions in calcining a ceramics green sheet on the porous sheet, the raw material and the calcining conditions have to be set up so that the shrinkage rate caused by heating up to the calcining temperature of the ceramics green sheet falls in a range of 5% or less. Accordingly, the calcining temperature for obtaining a porous sheet is preferably set higher than the calcining temperature for a ceramics green sheet. For example, zirconia or ceramics powder materials having higher sintering temperatures than that of zirconia, such as alumina, titania and celia can be selected as a structural material for a porous sheet used in producing a ceramics sheet comprising primarily zirconia.

The porous sheet used here reveals the actions of acceleration of degreasing, release of decomposition gas, and surface reforming. The preferred thickness thereof is 0.1 to 2 mm, more preferably 0.1 to 1 mm. The preferred weight is 0.01 to 1 g/cm$^2$, and more preferred weight is varied according to use forms thereof, the details of which will be described later. In case of a too thin porous sheet, a handling property is lowered due to lack of strength, and surface reforming effect is hard to reveal effectively. Meanwhile, in case of a too light porous sheet, a function as a weight is hard to reveal effectively, and effects for preventing warp and waviness become insufficient. Reversely, the use of a porous sheet which is heavy due to too large thickness or which is too heavy in itself increases abrasion between the green sheet and the porous sheet in calcining the green sheet and is liable to produce scratches on the sheet surface. Further, the shrinkage of the green sheet is hard to proceed uniformly, which is liable to cause distortion and cracking.

Figure 2:
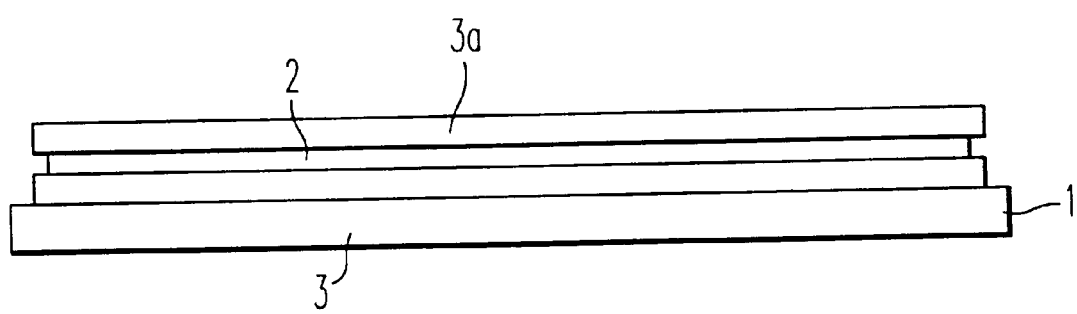
FIG. 2 is a drawing for explaining another example of the production method for the ceramics sheet according to the present invention.
Figure 3:
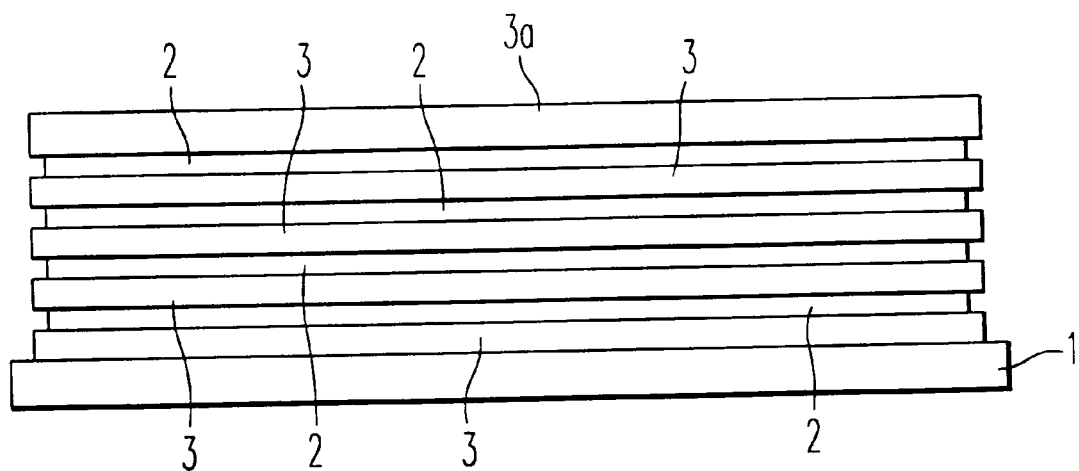
FIG. 3 is a drawing for explaining still another example of the production method for the ceramics sheet according to the present invention.

In calcining a ceramics sheet on the porous sheet described above, ceramics green sheets can be calcined one by one as is the case with a method in which as shown in FIG. 1, a ceramics green sheet 2 is superposed on a setter 1 doubling as fairing at a lower face side, on which a porous sheet 3a doubling as a weight is placed, and calcined, or a method in which as shown in FIG. 2, a porous sheet 3, a ceramics green sheet 2, and a porous sheet 3a doubling as a weight are superposed one over another on a heat insulating setter 1, and calcined. Available for enhancing productivity is a method in which as shown in FIG. 3, plural ceramics green sheets 2, 2,—are superposed one over another via porous sheets 3, respectively, and a thick porous sheet 3a doubling as a weight is placed on the top thereof, followed by calcining. The employment of such a method can provide plural ceramics sheets at one calcination and therefore is preferred. The uppermost porous sheet 3a may be of the same form as that of the porous sheet 3. It is preferably heavier than the porous sheet 3 in order to secure the effect of a weight. More preferable weights are 0.01 to 0.25 g/cm$^2$ for the porous sheet 3, and 0.2 to 1 g/cm$^2$ for the porous sheet 3a.

As described previously, since the porous sheet used in the present invention has bulk density corresponding to 30 to 85% of the theoretical density, calcination scarcely proceeds in the above calcining conditions for a green sheet, and an excellent gas permeability is secured, decomposition gas of a binder generated in calcining the green sheets releases smoothly to readily obtain homogeneous ceramics sheets even in sintering with plural green sheets superposed one over another as described above.

As can readily be found from the above descriptions, the methods described above can be very effectively applied in producing a large and thin ceramics sheet which is liable to cause waviness and warp in the calcination process. In particular, the above methods reveal the characteristics thereof more effectively by applying to the production of a ceramics sheet in which the area is as large as 400 cm$^2$ or more, particularly 600 cm$^2$ or more, and the thickness is as small as 1 mm or less, particularly 0.4 mm or less. Even the application of the above methods of the present invention to the production of a small ceramics sheet having an area of less than 400 cm$^2$ can provide ceramics sheets which are much smaller in waviness and warp and particularly excellent in loading strength and deflection strength comparing with ceramics sheets obtained by conventional methods. Accordingly, the methods of the present invention are never restricted by the size of a ceramics sheet produced.

EXAMPLES

The constitutions and the effects of the present invention will be explained below in more details with reference to examples, but the present invention will not be restricted by the following examples and can be carried out as well by suitably changing it within a range in which the scopes described above and later can be met, all of which are included in the technical scope of the present invention.

Example 1

[Preparation of Zirconia Green Sheet]Precipitates obtained by adding dropwise an aqueous solution of zirconium oxychloride containing yttrium chloride of 14.8 mol % to aqueous ammonia were washed and dried. Then, they were calcined at 1000° C. to obtain zirconia powder. This powder has average particle diameter of 1.5 μm, and the particles having the diameters of 3 μm or less accounted for 90 volume % of the whole particles in the powder.

Pure water was added to this powder to 20 weight %, and the mixture was pulverized with a beads mill for 2 hours. Then, the pulverized powder was dried at 500° C. to thereby obtain zirconia powder which had average particle diameter of 0.22 μm and in which the particles having the diameters of 0.7 μm or less accounted for 92 volume % of the whole particles in the powder and the particles having the diameters of 0.1 μm or more accounted for 90 volume %. Added to 100 weight parts of this powder as the raw material were 15 weight parts of acrylic-based binder containing 60 weight % of an isobutyl methacrylate unit and 20 weight % of a 2-ethylhexyl methacrylate unit, 40 weight parts of ethyl acetate as a solvent, and 2 weight parts of dibutyl phthalate as a plasticizer. All components were mixed with a ball mill, and after adjusting the viscosity, a zirconia green sheet having thickness of 0.25 mm was prepared by a doctor blade method.

[Preparation of Porous Sheet]

A low soda alumina powder having an average particle diameter of 55 μm and an acrylic-based binder were used to prepare a green sheet for a porous sheet having thickness of 0.2 mm by the doctor blade method.

After cutting and degreasing this green sheet at 500° C., the sheet was calcined at 1500° C. to obtain a porous sheet. This porous sheet had bulk density corresponding to 50% of the theoretical density and weight of 0.03 g/cm$^2$.

[Preparation of Porous Sheet for Weight]

A green sheet for a porous sheet having thickness of 0.6 mm was obtained in the same manner as that in the porous sheet described above, and two sheets of this green sheet were sticked together, followed by calcining it. This porous sheet for a weight had bulk density corresponding to 64% of the theoretical density and a weight of 0.24 g/cm$^2$.

[Preparation of Zirconia Sheet]

A porous sheet of about 42 square cm was placed in the center of a setter of 60 square cm, and total six sheets of the zirconia green sheet cut to about 40 square cm and the porous sheet were superposed alternatively one over another. Further, a porous sheet for a weight was placed thereon. After degreasing at 500° C., the green sheets were calcined at 1400° C. to obtain zirconia sheets of 30 square cm and thickness of 0.2 mm. These sheets were flat and had maximum height (Rmax) of 0.8 μm. No cracks were observed even with load of 140 kg applied all over the surface. A three-point bending strength tested with a sample of 5×50 mm cut out with a diamond cutter averaged 42 kgf/mm$^2$. The maximum warp and the maximum waviness in the three zirconia sheets are shown in Table 1. The dimension of the porous sheet was measured with a scale before and after using it for calcining the zirconia sheets, but no shrinkage was observed.

Example 2

Zirconia sheets of 20 square cm and thickness of 0.2 mm were obtained in the same manner as that in Example 1, except that a setter of 32 square cm was used in preparing zirconia sheets, total eight sheets of a porous sheet of 28 square cm and a zirconia green sheet of about 26 square cm were superposed alternatively one over another, a porous sheet for a weight was further placed thereon, and the zirconia green sheets were calcined. The maximum warp and the maximum waviness in the zirconia sheets thus obtained are shown in Table 1.

Example 3

Zirconia sheets of 15 square cm and thickness of 0.2 mm were obtained in the same manner as that in Example 1, except that a setter of 32 square cm was used in preparing zirconia sheets, total eight sheets of a porous sheet of 21 square cm and a zirconia green sheet of about 20 square cm were superposed alternatively one over another, a porous sheet for a weight was further placed thereon, and the zirconia green sheets were calcined. The maximum warp and the maximum waviness in the zirconia sheets thus obtained are shown in Table 1.

Example 4

[Preparation of Aluminum Nitride Sheet]

99 mol % of aluminum nitride powder and 1 mol % of yttrium oxide powder were pulverized and mixed with a beads mill. The powder after pulverizing had average particle diameter of 0.3 $\mu$m, and the particles having the diameters of 1 $\mu$m or less accounted for 92 volume % of the whole particles in the powder. 100 weight parts of this mixed powder, 18 weight parts of acrylic-based binder containing 80 weight % of an isobutyl methacrylate unit, and 3 weight parts of dibutyl phthalate were used to prepare an aluminum nitride green sheet having thickness of about 0.5 mm by the doctor blade method.

[Preparation of Auminum Nitride Sheet]

The same porous sheet as that used in Example 1 described above was placed on a setter, and one aluminum nitride green sheet described above and further one porous sheet were placed thereon. After degreasing at 500° C., the green sheet was calcined in a nitrogen-atmospheric furnace at 1700° C. to obtain a flat aluminum nitride sheet of 15 square cm and thickness of 0.4 mm.

Example 5

[Preparation of Zirconia-alumina Green Sheet]A zirconia-alumina green sheet having thickness of about 0.5 mm was obtained in the same manner as that in Example 1, except that aqueous solution of zirconium oxychloride containing 5.8 mol % of yttrium chloride was used and that an alumina powder was added to 40 weight % in pulverizing with the beads mill. The powder after pulverizing with the beads mill had an average particle size of 0.2 $\mu$m, and the particles having the diameters of 1 $\mu$m or less accounted for 95 volume % of the whole particles in the powder.

[Preparation of Zirconia-made Porous Sheet]

92 weight parts of mixed powder of a zirconia powder having average particle diameter of 2 $\mu$m and 8 weight parts of yttrium oxide powder, and 16 weight parts of acrylic-based binder were used to prepare a green sheet having thickness of 0.2 mm by the doctor blade method. This green sheet was cut and degreased, followed by calcining, whereby a porous sheet was obtained. This sheet had bulk density corresponding to 65% of the theoretical density and weight of 0.06 g/cm$^2$.

[Preparation of Zirconia-alumina Sheet]

A porous sheet of about 53 square cm obtained in the same manner as that in Example 1 was placed in the center of a setter of 60 square cm, and a zirconia-alumina green sheet cut to 52 square cm and the zirconia-made porous sheet described above were superposed thereon one over the other. After degreasing at 500° C., the green sheet was calcined at 1400° C. to obtain a zirconiaalumina sheet of 40 square cm and thickness of 0.4 mm.

Example 6

A zirconia-alumina sheet of 20 square cm and thickness of 0.4 mm was obtained in the same manner as that in Example 5, except that an alumina-made porous sheet and a zirconia-made porous sheet of each about 27 square cm, and a zirconia-alumina green sheet of 26 square cm were used.

Example 7

An alumina-containing zirconia sheet having diameter of 28 cm and thickness of 0.2 mm was obtained in the same manner as that in Example 1, except that 0.2% of alumina powder was added in a pulverizing process of a zirconia powder with a beads mill, total six sheets of a porous sheet having diameter of 37 cm and a zirconia green sheet having diameter of about 36 cm were superposed alternatively one over another on a setter of 40 square cm in a calcining process, and a porous sheet for a weight was placed thereon, followed by calcining the green sheet.

Example 8

A zirconia sheet was prepared in the same manner as that in Example 1, except that a porous sheet was used for a weight, having a weight of 1.3 g/cm$^2$ and thickness of 5.1 mm, obtained by sticking ten green sheets together in preparing the porous sheet for a weight, and then calcining the sticked green sheets. This sheet had maximum height (Rmax) of 6 $\mu$m.

Example 9

A zirconia green sheet was obtained in the same manner as that in Example 1, except that the pulverization of the powder with the beads mill was omitted. This zirconia green sheet was calcined in the same manner as that in Example 1 to prepare a zirconia sheet. A three-point bending strength tested with a sample of 5×50 mm cut out of this sheet with a diamond cutter averaged 28 kgf/mm$^2$.

Comparative Example 1

Only one zirconia green sheet prepared in the same manner as that in Example 1 was placed in the center of a setter. After degreasing at 500° C., the green sheet was calcined at 1400° C. in a gas furnace to obtain a zirconia sheet of 30 square cm and thickness of 0.2 mm.

This sheet had a little large waviness and was cracked when a load of 110 kg was applied all over the surface. Several fine particles of a silica-alumina matter were sticked on the surface. Such sticked particles were not observed in Example 1.

Comparative Example 2

An alumina powder and an acrylic-based binder were used to prepare an alumina green sheet having thickness of 0.08 mm by a doctor blade method. This alumina green sheet was placed in the center of a setter of 50 square cm, and total seven sheets of the zirconia green sheets of Example 1 cut to 40 square cm and alumina green sheets were superposed thereon alternatively one over another. After degreasing at 500° C., the green sheets were calcined at 1400° C., whereby the sheets having a very large waviness were prepared. In this connection, large wavinesses produced all over the surface made it impossible to measure warp. In order to correct the wavinesses, heat treatment was given again at 1400° C. under applying a load, which resulted in breakage.

Comparative Example 3

The porous sheet prepared in Example 1 was placed in the center of a setter of 50 square cm, and the zirconia-alumina green sheet of Example 5 cut to 40 square cm, and an alumina plate with high purity, density (99% of the theoretical density) having a weight of 2 g/cm$^2$ were superposed thereon one over the other. The green sheet was degreased at 500° C. to find that the degreased zirconia-alumina green sheet had countless small creases generated and was broken.

Comparative Example 4

A trial to prepare a porous sheet was carried out in the same manner as that in Example 1, except that 18 weight parts of binder was used to high purity alumina fine powder having average particle diameter of 0.15 μm. However, a sheet obtained by calcining this green sheet at 1500° C. had bulk density corresponding to 96% of the theoretical density and did not become a porous sheet. Also, a sheet prepared by calcining this green sheet at 1000° C. in order to make the bulk density about 60% of the theoretical density, was used and superposed alternatively on the zirconia sheet in the same manner as that in Example 1, followed by calcining to find that a large waviness was generated on the zirconia sheet. The porous sheet was shrunk by 15% in calcining the zirconia sheet.

The maximum waviness heights and the warps of the sheets obtained in the examples and the comparative examples described above are shown in Table 1.

TABLE 1

|  | Maximum waviness height (μm) | Warp (%) | Load-applying test result Cracked: Frequency of *1 seet nos. generated cracks (%) | Deflection-laod test result Cracked: Frequency of *2 sheet nos. generated cracks (%) |
|---|---|---|---|---|
| Example | | | | |
| 1 | 20 | 0.01 | 0 per 20 sheets: 0% | 0 per 20 sheets: 0% |
| 2 | 20 | 0.05 | 0 per 20 sheets: 0% | 1 per 20 sheets: 5% |
| 3 | 15 | 0.08 | 0 per 20 sheets: 0% | 0 per 20 sheets: 0% |
| 4 | 25 | 0.05 | 0 per 3 sheets: 0% | 0 per 3 sheets: 0% |
| 5 | 15 | 0.004 | 0 per 10 sheets: 0% | 1 per 10 sheets: 10% |
| 6 | 15 | 0.05 | 0 per 10 sheets: 0% | 1 per 10 sheets: 10% |
| 7 | 50 | 0.05 | 0 per 5 sheets: 0% | — |
| 8 | 30 | 0.1 | 0 per 5 sheets: 0% | 0 per 5 sheets: 0% |
| 9 | 100 | 0.08 | 0 per 5 sheets: 0% | 0 per 5 sheets: 0% |
| Comparative example | | | | |
| 1 | 150 | 0.3 | 2 per 6 sheets: 33% | 2 per 4 sheets: 50% |
| 2 | 6 (mm) | *** | 4 per 4 sheets: 100% | — |
| 4 | 230 | 0.5 | 2 per 10 sheets: 20% | 2 per 8 sheets: 25% |

***Impossible to measure
*1 Test method is described in the specification
*2 Test method is described in the specification Effect of the Invention The present invention is constituted as described above. That is, a decomposition gas of a binder can be released evenly and smoothly all over the surface by employing the method in which there is used a porous sheet in which the shrinkage factor and the bulk density in calcining conditions, and the size to a ceramics green sheet are specified. In addition, with using the above porous sheet, a ceramics sheet of a high quality having very little warp and waviness can be provided by suppressing deformation caused by shrinkage in calcination.

What is claimed is:

1. A plurality of flat and large ceramic sheets wherein each sheet has an area of 600 cm$^2$ or more and thickness of 0.4 mm or less, and wherein 10% or less of said plurality of sheets crack in the following load-applying test:

load-applying test: a ceramics sheet is interposed between alumina plates with high density having flat faces, and a load of 0.1 kgf/cm$^2$ is applied on the whole face of the ceramic sheet, and wherein each sheet is obtained by heat treating a green sheet to form a ceramic sheet, wherein said heat treating comprises calcining said green sheet, and wherein during said calcining, interposing the green sheet between porous sheets which have bulk density corresponding to 30 to 85% of the theoretical density and in which the shrinkage rate caused by heating up to the calcining temperature of said green sheet is 5% or less on condition that the periphery of the green sheet does not protrude from the porous sheets, and wherein said ceramic sheet consists essentially of zirconia.

2. A ceramic sheet obtained by heat treating a green sheet to form said ceramic sheet, characterized in that the ceramic sheet has an area of 600 cm$^2$ or more, thickness of 0.4 mm or less, maximum waviness height of 100 μm or less, and warp of 0.1% or less and that frequency of generated cracks is 10% or less when the following load-applying test and deflection-loading test are carried out in succession:

load-applying test: a ceramic sheet is interposed between alumina plates with high density having flat faces, and a load of 0.1 kgf/cm$^2$ is applied on the whole face of the ceramic sheet;

deflection-loading test: force is applied to two oppositely disposed sides of a ceramic sheet in a direction which is parallel to the surface of the sheet and in which the sides are pushed so as to deflect the ceramic sheet, and deflection height h (mm) is expressed by the following equation:

$$h=0.002 \times d/t^2 \text{ (provided that } h<0.1 \times d)$$

wherein d (mm) is a distance between the oppositely disposed sides, and t (mm) is the thickness of the ceramic sheet; and a deflecting operation is repeated six times at one time/second alternatively in front and back directions, wherein said heat treating comprises calcining said green sheet, and wherein during said calcining, interposing the green sheet between porous sheets which have bulk density corresponding to 30 to 85% of the theoretical density and in which the shrinkage rate caused by heating up to the calcining temperature of said green sheet is 5% or less on condition that the periphery of the green sheet does not protrude from the porous sheets, and wherein said ceramic sheet consists essentially of zirconia.

3. A ceramic sheet as claimed in claim 2, additionally containing an oxide of at least one metal selected from the group consisting of Y, Ce, Ca, Mg, Ti, Si, and Al.

4. A ceramic sheet as claimed in claim 3, wherein the zirconia is cubic crystallized zirconia.

5. A ceramic sheet as claimed in claim 2, wherein said sheet is used as an electrolytic film for a fuel cell.

6. A ceramic sheet as claimed in claim 2, wherein a raw material powder for said sheet has average particle diameter of 0.1 to 0.5 μm, and 90 volume % or more of said powder has a particle diameter of 1 μm or less.

7. A ceramic sheet as claimed in claim 2, wherein said sheet is square or rectangular.

8. A ceramic sheet as claimed in claim 2, wherein said sheet has bulk density corresponding to 90% or more of the theoretical density.

9. A production method for a ceramic sheet according to claim 2, comprising:

interposing a green sheet between porous sheets which have bulk density corresponding to 30 to 85% of the theoretical density and in which the shrinkage rate caused by heating up to the calcining temperature of said green sheet is 5% or less on condition that the periphery of the green sheet does not protrude from the porous sheets, and calcining the green sheet to produce the ceramic sheet.

10. A production method as described in claim 9, producing the ceramics sheet using a porous sheet having thickness of 0.1 to 2 mm and a weight per unit area of 0.01 to 1 g/cm$^2$.

11. A production method as described in claim 9, wherein each porous sheet comprises at least one oxide selected from the group consisting of alumina, titania, silica, ceria and zirconia as a main component and has been calcined at higher temperature than the calcining temperature of said green sheet.

12. A production method as described in claim 9, wherein each porous sheet has been obtained by calcining a green sheet has been obtained by molding a slurry containing powder having average particle diameter of 2 to 100 μm and a binder into a sheet so that the bulk density becomes 30 to 85% of the theoretical density.

13. A production method as described in claim 9, wherein said ceramic sheet additionally contains an oxide of at least one metal selected from the group consisting of Y, Ce, Ca, Mg, Ti, Si, and Al.

14. A production method as described in claim 13, wherein the zirconia comprises cubic crystalized zirconia.

15. A production method as described in claim 9, using raw material powder which has average particle diameter of 0.1 to 0.5 μm and in which 90 volume % or more of said powder has a particle diameter of 1 μm or less.

16. A production method as described in claim 9, wherein the ceramic sheet is used as an electrolytic film for a fuel cell.

* * * * *